Dec. 9, 1952 W. D. FORD 2,620,597
METHOD OF PREPARING CELLULAR GLASS
Filed April 9, 1947 2 SHEETS—SHEET 2
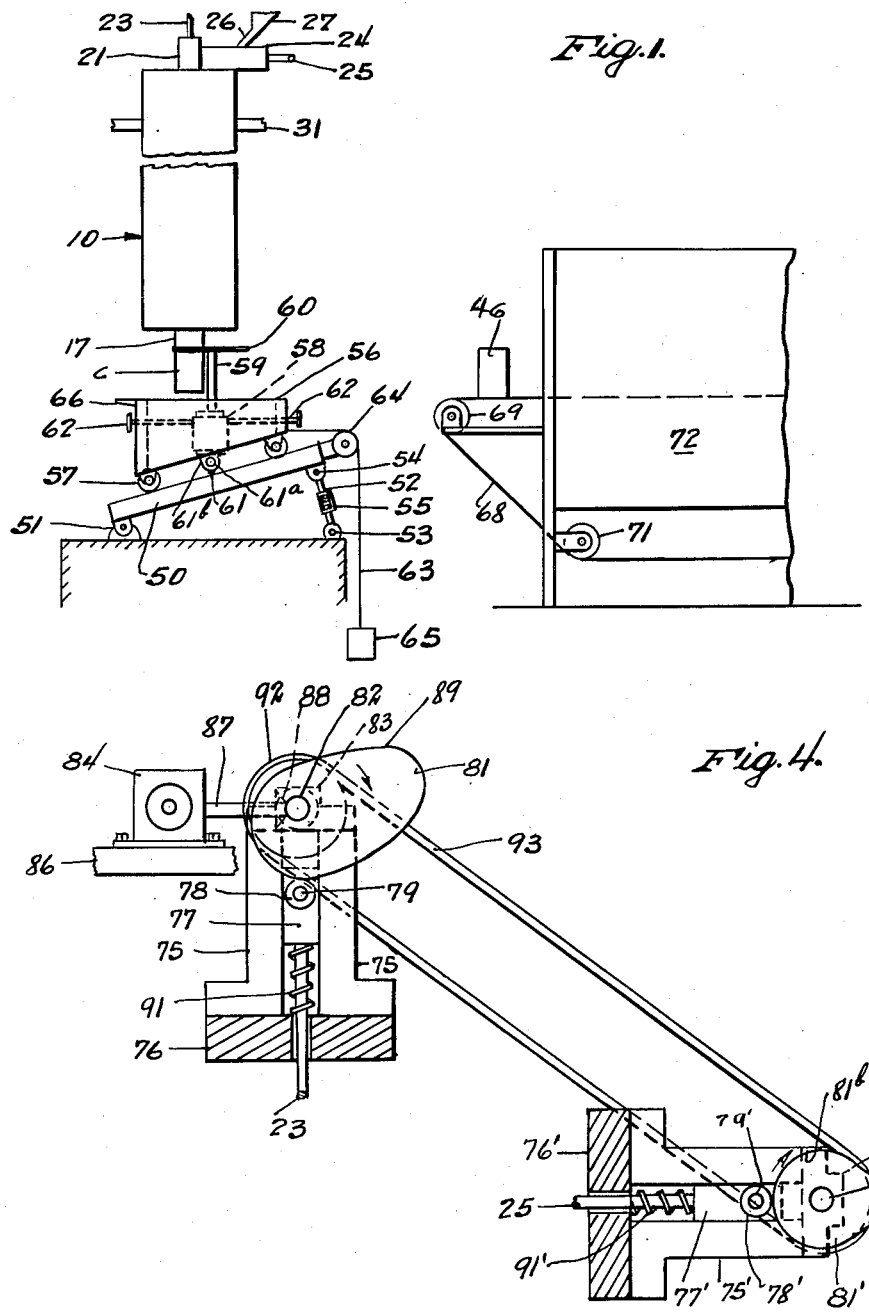
INVENTOR.
WALTER D. FORD
BY Olen E. Bee
ATTORNEY.

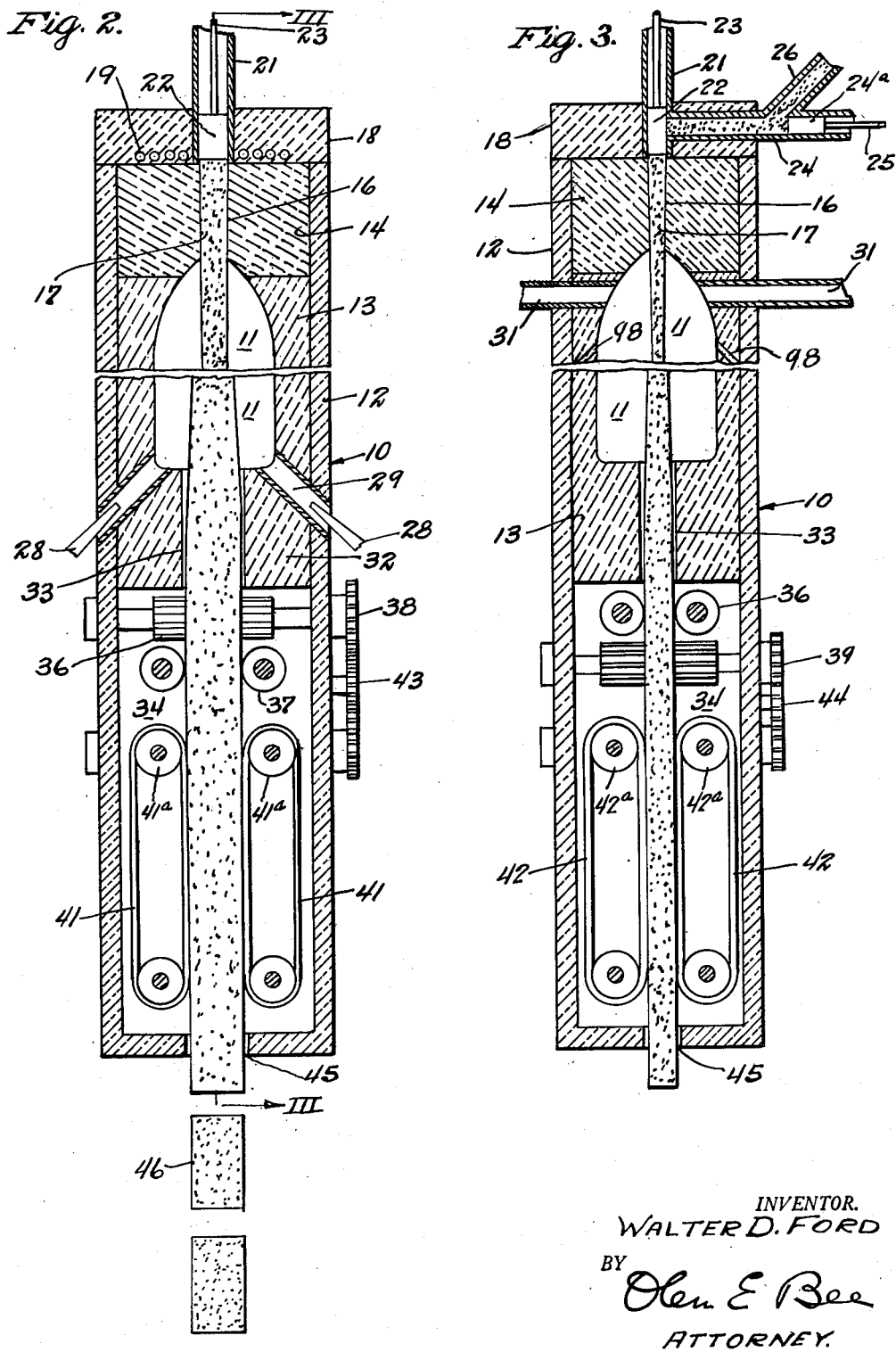

Patented Dec. 9, 1952

2,620,597

UNITED STATES PATENT OFFICE 2,620,597

METHOD OF PREPARING CELLULAR GLASS

Walter D. Ford, Port Allegany, Pa., assignor to Pittsburgh Corning Corporation, Allegheny County, Pa., a corporation of Pennsylvania Application April 9, 1947, Serial No. 740,283

1 Claim. (Cl. 49—77)

The present invention relates to a process for preparing a light weight cellular product adapted for use as a heat insulation medium, as floats for life rafts, fishing nets and various other embodiments of floating apparatus or equipment and it has particular relation to a process for forming such bodies by heating to a temperature slightly above the sintering or softening point a mixture of finely pulverized glass or a mineral susceptible of sintering to a coherent plastic state and a gassing agent in order to form a sintered, bloated mass.

One object of the invention is to provide a process of forming cellular bodies and notably cellular bodies of glass, in which the use of molds of refractory material is obviated.

A second object is to avoid the necessity of providing mold surfaces with protective parting coatings to prevent cohesion between the mold surfaces and the hot glass being cellulated.

A third object is to obviate the use of expensive stainless steel apparatus such as conveyors and the like, heretofore employed to conduct materials to be cellulated, through the furnace.

A fourth object is to obviate the heat losses attending the operation of heating molds up to the temperature requisite to the sintering and cellulation of the glass.

A fifth object is to obviate the labor involved in maintaining the molds heretofore employed in cellulating glass.

A sixth object is to obviate the labor involved in coating, filling and stripping the molds.

These and other objects of the invention will be apparent from the following specification and the appended claim.

It has heretofore been proposed to form bodies of glass or glass like materials having a highly cellular or bubble like structure which by reason of the many voids therein are of high thermal insulation value and which are also adapted to be used as floats for life rafts and for other purposes where a light weight material resistant to permeation by liquids is desired. Various methods have been proposed for forming such materials. For example, it has been suggested to incorporate gas producing agents such as silicon carbide or other gas producing powders with molten glass in such manner that the gas producing agent after admixture with the molten glass would give off gas, thus forming a highly cellulated body. Adequate mixing of the gassing agent and the glass has not been attained by such method and satisfactory products, insofar as is known, have never been so produced.

The preferred and commercial method of forming cellular glass, up to the present time, involved admixing glass in finely powdered form with a gassing agent, notably powdered carbon such as carbon black or powdered coal and perhaps with an oxygen giving agent such as a small amount of antimony trioxide, arsenic oxide or a sulfate such as calcium sulfate. The mixtures were conventionally introduced into closed molds of refractory material, of which certain refractory stainless steels have been found to be best adapted. The mixtures of powders in the molds were then heated up by passing the molds through suitable furnaces equipped with conveyors, preferably of stainless steel, until the particles of glass were sintered together and the gassing agent was caused to react to form entrapped bubbles of gas in the sintered mass. In this manner, bodies of extremely light weight and high resistance to transmission of heat were obtained. The bodies were also impermeable to water, or nearly so, and were resistant to fire, vermin and many other agencies to which most insulative materials are susceptible.

Although very satisfactory products could be prepared by such methods, nevertheless, there were many features attending the process or processes which were objectionable. For example, the refractory molds were expensive and they required frequent repairs and renewal within relatively short periods of time because of the excessive temperatures to which they were subjected in the various heating operations. Moreover, much labor was involved in filling the molds. Also, the molds required preliminary coatings of a refractory parting agent such as bauxite or other suitable material adapted to be formed into a water slurry and sprayed or otherwise coated upon the interior surfaces of the molds in order to prevent adhesion between the mold surfaces and the glass being cellulated. Molds were also objectionable because it was desirable to strip them from the cellular bodies after they had been formed. Usually, the stripping operation necessitated various cooling and shock heating operations as a preliminary in order to free the cellular bodies and admit removal of the molds. Needless to say, the molds themselves absorbed much heat before they became sufficiently heated to effect the sintering and bloating of the mass and this heat was all wasted.

In most instances, the bodies formed in the molds tended to shrink to an appreciable degree during the various cooling operations and this shrinkage tended to produce sagging of the upper surfaces. At the same time, the edge portions of bodies such as blocks or slabs as obtained from the molds were not smooth and regular so that it was necessary to trim away a great deal of the highly valuable cellular material in order to obtain the regular bodies desirable for commercial use. This trimming cut away the durable, rigid outer skin of the bodies.

Another objectionable feature attending the conventional method of forming cellular glass resided in the fact that only preformed glass could be employed as the starting material. This was relatively expensive to obtain. Needless to say, expense was involved in forming and melting down the glass then pulverizing the glass and subsequently reheating the pulverized material in admixture with suitable gassing agents to the sintering and bloating temperature.

In accordance with the provisions of the present invention it is proposed to obviate the foregoing difficulties by forming the cellulatable materials such as a mixture of powdered glass, a blast furnace slag, feldspar aplite, clay, etc. and a suitable gassing agent, into a column which is maintained in vertical position and heated upon all lateral sides without any confinement by external surfaces while moving downwardly within a vertical furnace, until the material is sintered into a coherent body and the gassing agents are reacted to form a bloated column composed of a mass of bubbles having very thin walls of glass. If desired, this column can then further be shaped while it is still soft and plastic by passing it between suitable rollers or other forming devices to impart thereto a regular section, e. g. a rectangular section suitable for cutting into slabs or blocks appropriate for insulation purposes and the like.

For a better understanding of the invention, reference may now be had to the accompanying drawings in which Fig. 1 illustrates diagrammatically a suitable layout of apparatus for use in the practice of the invention; Fig. 2 is a sectional view of the apparatus shown in Fig. 1 suitable for use in practicing the invention; Fig. 3 is a sectional view taken substantially upon the line III—III of Fig. 2; Fig. 4 is a fragmentary detail view showing on a larger scale suitable mechanism for propelling cellulatable material into the furnace.

In the drawings like numerals refer to like parts throughout.

In the apparatus as shown in the drawings, a furnace 10, preferably in the form of a vertical column of substantial height, is provided. This furnace includes an upper or heating and cellulating chamber 11 and includes an outer jacket 12 which may be of insulative material such as cellulated glass or any other material sufficiently insulative to heat and also sufficiently refractory to withstand the high temperatures involved in the operation of the construction. The insulation material 12 may enclose a highly refractory material such as fire brick or any other material of sufficient strength and resistance to high temperatures, indicated at 13. The upper end of the furnace is provided with a block or die 14 of refractory material such as graphite or any other material adapted to withstand the high temperatures of operation. The die 14 is provided with an opening 16, of a tapering cross-section substantially less in area than that of the heating chamber 11, through which a column of material 17 adapted to be heated to form the cellulated structure is caused to move. The exterior face of block or die 14 and portions of conduit 21 are covered by and preferably cooled by a block 18 of refractory material which may be provided with cooling conduits 19 through which a cooling medium such as water is circulated.

In order to feed compacted material through the die 14 into the furnace, a conduit or cylinder 21 of steel or other strong abrasion resistant material is disposed in coaxial alignment with the die opening 16 and provided with suitable means for compacting and forcing material to be cellulated downwardly through the die 14 into the furnace chamber 11. Such means may take the form of a ram 22 upon a rod or shaft 23 which is reciprocated by any convenient mechanism (later to be described). Material to be cellulated may be fed into the conduit or cylinder 21 by means of a lateral branch 24 in which is disposed a ram 24a or other feeding device on rod 25. The rams may also be replaced by suitable screw conveyors or worm feeds, if so desired. Material is fed to ram 24a by means of a branch 26 discharging into the branch 24 and which may also lead to an appropriate hopper 27.

Means for supplying heat to the furnace chamber 11 may include gas burners 28 in any desired size and number discharging through passage ways 29 into the lower portion of the furnace chamber 11 upon opposite sides of the column of the material to be cellulated. The gases comprising a combustible mixture of air and an appropriate gaseous fuel pass upwardly through the furnace chamber during combustion, are discharged by a flue or series of flues 31 near the top of the chamber.

A partition 32 also of refractory material such as fire brick partially separates the heating chamber from the lower or forming portion of the furnace and is provided with an opening 33 through which the heated cellulating column of material in the furnace is adapted to be discharged downwardly into a lower chamber 34 where the material may be rolled to impart thereto a desired section and may also be partially cooled in order to impart rigidity at least to the outer surface thereof.

An appropriate rolling mechanism comprises upper rollers 36 of refractory material engaging opposed surfaces of a cellulating mass. The remaining two surfaces, in turn, are rolled by lower rollers 37 also of refractory material. Rollers 36 and 37 needless to say, are driven in any convenient manner at a desired speed corresponding to that at which the material in the furnace is cellulated. In the drawings the rollers are shown as extending externally of the furnace and as being provided with gears 38 and 39 which may be engaged by sprocket chains or by other gears (not shown) in order to drive them at desired speed.

Means for supporting the cellular material during the preliminary stages of cooling in the chamber 34 include conveyors 41 and 42 of refractory material such as a mesh belt of stainless steel or a band of steel or asbestos designed to engage the surfaces thus providing a broad area of contact to permit of supporting the column above without applying excessive localized pressure to any portions of the still soft and plastic material. These conveyors are trained about rollers 41a and 42a having drive connections 43 and 44 with gears 38 and 39. These connections may comprise gears or chains, etc.

The material passes from the chamber 34 through an opening 45 and in its downward progress, may be cut into sections as indicated at 46 suitable for annealing in a lehr.

Apparatus for cutting the strip or column of cellulated glass, as it emerges from the chamber 34, into units 46 of appropriate length for annealing, includes a track 50 which may be hinged as indicated at 51 for tilting or angular adjustment. The swinging end is supported by means of a link 52 hinged at one end to a convenient support as indicated at 53 and at the other end, being hinged to the track 50 as indicated at 54. It is shortened or lengthened by turnbuckle 55. A carriage 56 is provided with wheels 57 designed to run upon the track and carries a motor 58 provided with a vertical drive shaft 59 carrying a saw or cutting disc 60 of abrasive.

In order to permit the cutting element 60 to be tilted to compensate for changes in the angle of the track 50, the motor is provided with a bracket 61, journaled on a shaft 61a in bearings 61b on the lower side of the carriage 56. Set screws 62 provide for adjustment of and holding of the motor at a desired angle.

The carriage 56 is also provided with a cable 63 running over a pulley 64 upon track 50 and being provided at its extremity with a counterweight 65 designed to balance the weight of the carriage and the saw mechanism. Carriage 56 may be reciprocated by appropriate mechanical means (not shown) or if preferred it may be operated manually, for example, by means of a handle 66. It will be apparent that the angle of the track 50 is adjusted in such manner that when the carriage 56 is reciprocated to cause the saw or disc 60 to engage the strip of cellular material moving out of the chamber 34 the disc as it moves transversely will also move downwardly at a speed approximating the movement of the material being cut. By adjustment of screws 62 the angle of saw 60 can be adjusted. The blocks or units of cellular material 46 which have solidified upon the outside, but are still above the critical or annealing temperature are disposed upon a conveyor such as a wire mesh or link belt 68 trained about pulleys 69 and 71 and are carried through the lehr 72 where the units are slowly cooled below the critical temperature in order to relieve the internal strains therein.

It will be apparent that suitable mechanism for reciprocating the piston rods 23 and 25 in order to feed compacted pulverized material into the cellulating furnace should operate to impel the material downwardly as continuously and as positively as possible in order to maintain the desired ratio of distance traveled by the feed with respect to that of the conveyors 41 and 42. This rate will average approximately ½ the rate of the conveyors thus compensating for the longitudinal expansion of column 17. To this end, the rod 23 should be impelled slowly and uniformly downwardly during the feeding stroke and should return to its upper position as quickly as possible after the completion of the stroke preparatory to the initiation of the next stroke. Correspondingly, the rod 25 should be impelled forwardly to feed a new portion of pulverized material into the vertical cylinder 21 during the short period of the return stroke of the rod 23. Apparatus to accomplish this purpose includes substantially the same elements for each rod or ram. Accordingly, the numerals for the two will correspond except for the application of prime marks to the mechanism for operating the rod 25. The description of the two mechanisms in the main apply interchangeably.

The apparatus includes parallel guides 75 secured to any convenient supports 76, a cross head 77 slides between the guides 75 and is provided with a follower roller 78 designed to rotate upon a stud shaft 79 extending from the cross head. In order to reciprocate the cross head, the follower roller 78 engages cam 81 upon a drive shaft 82 journaled in bearing 83 upon the extremities of the guide 75. The shaft 82, it will be observed, is appropriately driven by a synchronous motor and a speed reducing mechanism 84 upon a convenient support 86. Drive shaft 87 from this mechanism is provided at its extremity with a bevel gear 88 engaging a corresponding gear upon the shaft 82.

It is to be observed that the cam 81 is shaped to give approximately uniform downward motion to the cross head. However, the portion of the cam surface indicated at 89 corresponding to the return stroke is flattened in order to admit of as rapid return of the rod 23 as possible preparatory to the next stroke. For purposes of returning the cross head 77 to its uppermost position, a helical spring 91 is coiled about the rod and bears at its upper extremity against the cross head 77. At its lower extremity it bears upon the support 76 in such manner as to exert an upward pressure.

In order to drive the cams 81 and 81' in synchronism shafts 82 and 82' are respectively provided with sprocket gears 92 and 92' about which are trained sprocket chain 93.

It is to be observed that the cams 81 and 81' are arranged in phase to act alternately. That is, one dwells while the other works to actuate its follower. The cam 81 during the working portion of its rotation, impels the cross head 77 downwardly with a slow and uniform motion. In counterdistinction, the cam 81' is designed with a peak or lobe 81a, so that during the working portion of its stroke, it impels the rod 25 forwardly to feed a fresh portion of pulverized material into the feed cylinder 21 as rapidly as possible and then permits the rod quickly to return to the starting point, the object being to attain maximum uniformity of flow of the column 17 through die 14 and as short a stoppage as possible for introduction of additional charge. The main portion of the cam 81' is circular as indicated at 81b so that during most of its revolution arm 25 is stationary.

In the operation of the apparatus shown, various materials may be employed to provide the cellular mass. The more conventional material, of course, is finely pulverized glass such as glass consisting primarily of silica, lime and sodium or their equivalents well understood in the glass industry or a borosilicate glass.

Other materials that may be employed alone or in substantially any mixture with pulverized glass include blast furnace slag, feldspar, aplite, clays, shales all in finely powdered form and admixed with appropriate gassing agents in small amount. The requisite adjustment of the temperature of the furnace to bring the specific material to a coherent, plastic state should be made in each instance.

If the glass is employed, it preferably should be very finely pulverized, e. g. to pass a screen of not more than 100 mesh or preferably so fine as to pass a screen of 200 or 400 mesh or even finer, e. g. to an average particle size of 5 microns. The limit of fineness is imposed by the economics of the grinding operation.

If pulverized glass is employed, it is admixed with an appropriate gassing agent which may comprise a small amount of a substance adapted to decompose under heat to give off gases. Usually, it is so selected that it will be decomposed at least to an appreciable degree at a temperature within the range at which the particles of glass completely sinter together and soften sufficiently to admit of the bloating action attending cellulation. Calcium carbonate is an example of such material and may be employed in a range of, for example ½ to 2% dependent upon the degree of cellulation desired. It, too, should be in very finely pulverized or pigmentary form, for example, such as may be obtained by precipitation of calcium carbonate by chemical methods. It will be apparent that urea may be substituted for calcium carbonate and a convenient amount would be ½ to 2%. It may be supplied in powder form. Finely pulverized carbon or carbonaceous materials such as carbon black, lamp black or powdered coal may also be mixed with the powder of glass or other sinterable material in amounts of 0.1 up to 5% by weight, dependent somewhat upon the degree of cellulation desired and the material employed. A good average is 0.1 to 2% based upon the weight of the glass. If the glass is low in sulfates and other oxygen giving substances, it may be desirable to include a small amount e. g. 0.2 to 5% by weight of calcium sulfate, antimony trioxide or arsenic trioxide designed to provide oxygen to gasify the carbonaceous material.

The ram 22 in forcing the mixture of pulverulent materials downwardly through the heated die passage 16 will of course cohere them in such manner as to form the column 17 in the furnace. The ratio of gaseous fuel to air throughout the entire furnace chamber preferably is controlled to maintain a reducing atmosphere at least in the upper portions of the furnace where the entering column 17 is exposed to this atmosphere. To this end, inlets 98 for reducing gases may be provided. A slight oxidizing condition may thus be maintained in the remainder of the furnace chamber 11 in order to burn out some surface carbon and provide denser surface skin on the column.

In the furnace, the temperature is so controlled that before the mixture of ingredients in column 17, to be sintered and bloated, reach the bottom of the heating chamber 11 they are adequately cohered and the bloating gases are liberated in substantial quantity so that the column begins to expand. This temperature will depend upon the materials being heated. Some glasses, of course, are more difficult to soften by heat than others. For most purposes a cellulating temperature of 1550° F. near the bottom portion of the furnace is employed. At the top portion the sintering temperature will approximately correspond to 1400° F. In the chamber 34 the temperature will be approximately 1200° F.

In the operation of the apparatus as previously described it is desirable that the rate of introduction of the material to be cellulated through the inlet passage or conduit 21 be properly correlated with the rate of cellulation and the rate of emission of the cellulated material from the chamber 11. For example, it will be found that in most instances the material in cellulation will approximately double its linear dimensions. That is, the material will expand transversely to approximately twice its original width and similarly it will double in length and also in thickness. In order to prevent distortions and rupture of the cells comprising the material it is therefore necessary that the forming rollers 36 and 37 as well as the belts 42 move at approximately double the rate of the material moving through the passage 16 of the block 14. Some slight variation of this ratio may be desirable to meet individual conditions in operation. For example, the material may increase to slightly more than twice its original dimensions or it may not cellulate to quite such an extent. Slight changes in rate of removal accordingly may be desired and can be attained by speeding up or slowing down the forming rollers and the conveyor belts. The material when formed under such conditions is subject to a minimum of distortion and resultant rupture of the cell structure.

It is further to be observed that in order to reduce cell distortion to a minimum, the material after it is emitted from the throat 16 of the block 14 is permitted to move downwardly through the chamber 11, the opening 33 and the opening 45 without being contacted with stationary surfaces. In this way, the possibility of distortions is obviated. It is also apparent that during the heating and cellulation of the material, the latter is at no time forced to pass through any restricted throats or passages which would tend to cause elongation of the cell structure with possible rupture of many of the cell walls. The material after it moves out of the passage 16 is free to expand and as it becomes sufficiently heated throughout its cross-sectional area, it expands uniformly to its maximum both vertically and horizontally.

It will be apparent to those skilled in the art that numerous modifications may be made herein without departure from the spirit of the invention or the scope of the appended claim.

I claim:

A method of producing cellular glass from a mixture of finely pulverized glass and a carbonaceous gassing agent giving off gases at and above the sintering point of the glass, comprising the steps of extruding the mixture into a vertical cohered column, passing the extruded column through a vertically disposed heating chamber without contact therewith, maintaining a substantially reducing atmosphere within the heating chamber adjacent the entering portions of the column, maintaining a slightly oxidizing atmosphere within the remaining major portions of the heating chamber for modifying the face of the column by burning out surface carbon upon the heated moving column before it reaches cellulating temperature, retaining the modified moving column within the heating chamber until cellulation is substantially completed, passing the cellulated column into a cooling chamber, vertically supporting the moving column within the cooling chamber until it has sufficiently annealed to permit handling, and then severing the column.

WALTER D. FORD.

REFERENCES CITED

The following references are of record in the file of this patent:

UNITED STATES PATENTS

| Number | Name | Date |
|---|---|---|
| 708,309 | Bronn | Sept. 2, 1902 |
| 1,818,101 | Slidell | Aug. 11, 1931 |
| 1,874,799 | Peiler | Aug. 30, 1932 |
| 1,928,435 | Powell | Sept. 26, 1933 |
| 2,067,313 | Coryell | Jan. 12, 1937 |
| 2,114,545 | Slayter | Apr. 19, 1938 |
| 2,156,457 | Long | May 2, 1939 |
| 2,215,223 | Lytle | Sept. 17, 1940 |
| 2,255,238 | Willis | Sept. 9, 1941 |
| 2,289,787 | Kaschke et al. | July 14, 1942 |
| 2,322,581 | Lytle | June 22, 1943 |
| 2,341,059 | Parsons | Feb. 8, 1944 |
| 2,354,807 | Fox et al. | Aug. 1, 1944 |
| 2,417,094 | Spinasse | Mar. 11, 1947 |